Figures 1, 2:
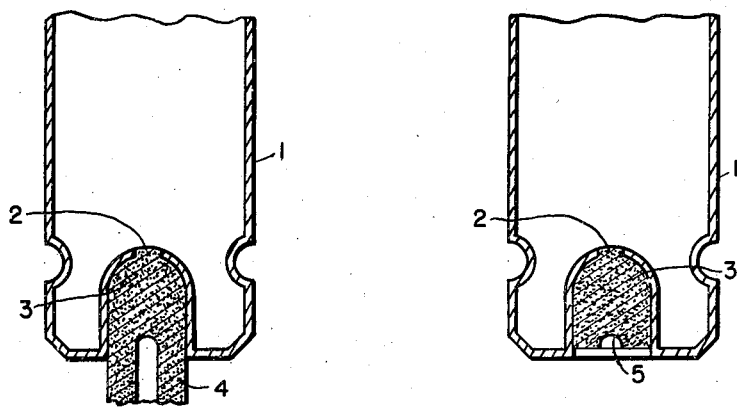

July 19, 1949.   W. A. ROOVERS   2,476,387
METHOD OF EXHAUSTING AND CLOSING VESSELS
Filed Feb. 14, 1947

INVENTOR
WILHELMUS ANTONIUS ROOVERS
BY
AGENT

Patented July 19, 1949

2,476,387

UNITED STATES PATENT OFFICE 2,476,387

METHOD OF EXHAUSTING AND CLOSING VESSELS

Wilhelmus Antonius Roovers, Eindhoven, Netherlands, assignor to Hartford National Bank and Trust Company, Hartford, Conn., as trustee Application February 14, 1947, Serial No. 728,510
In the Netherlands May 25, 1944

Section 1, Public Law 690, August 8, 1946
Patent expires May 25, 1964

6 Claims. (Cl. 316—18)

This invention relates to a method of exhausting and closing a vessel whose wall consists at least in part of metal, for example an electric discharge tube having a metal bottom. The invention relates, in addition, to a vessel adapted to be manufactured by this method.

It is known to exhaust an electric discharge tube whose wall consists at least in part of metal through one or a plurality of apertures provided in the metal portion and, subsequently, to close the tube with the aid of a solder which is applied in the vicinity of the aperture and which is fused by heating and which thus closes the aperture.

As a rule, we thus obtain a highly satisfactory obturation of the tube. In several cases, however, difficulties may arise owing to the fact that the solder, as soon as it has been fused, flows out not only in the aperture but also at other areas, for example on the outside of the tube where it settles as a projecting plug against the bottom. This may involve drawbacks and give rise to an additional operation consisting in the removal of this excess amount of solder.

Now, this drawback may be obviated by utilising a method according to the invention whereby a vessel whose wall consists at least in part of metal is exhausted through an aperture of this metal part of the wall and subsequently closed by heating an obturating material provided on the edge of this aperture, this obturating material, for example a low-melting solder, such as tin, being coated before the obturation of the tube with a film of a metal, which does not soften at the temperature used in closing the aperture of the vessel which is to be exhausted and closed. Now, several advantages are thus obtained. In the first place the solder remains better within the desired space since, when this higher melting film were not present, there is the possibility that the solder flows away laterally of the aperture. This danger exists more particularly in those cases in which the aperture whose wall is covered with solder is closed by pressing on it, a movable metal body, for example in the manner as described in my copending application for a U. S. patent, Serial No. 683,084, filed July 12, 1946. Consequently the method according to the invention is applicable with advantage to tubes whose exhaust aperture is closed in the manner described in my copending application. By the method according to the invention there is in this case also a better contact between the body with the aid of which the aperture is closed and the obturating material since the latter retains a good compactness, and further there is a smaller possibility that the solder adheres to the said body.

Different combinations of materials are possible. Thus, as the obturating substance use may be made of a known solder, for example tin, which may be coated with a film of nickel or copper. It is also possible, for example, to use silver as the soldering material and to cover it with a film of nickel. The simplest manner is to apply these protective films by electrolytic means. They have, as a rule, a small thickness, for example, of the order of magnitude of from 10 to 50 microns.

Figure 3:
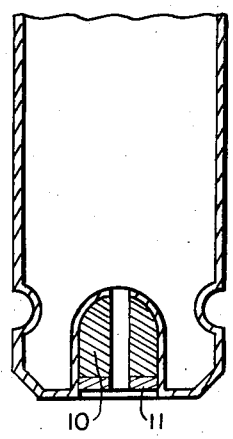

The invention will now be explained more fully with reference to the accompanying drawing in which Fig. 1 shows the closed extremity of a vessel having a wall partly of metal, in which the obturating substance is not coated with a film of higher melting material; and Fig. 2 shows such an extremity in which, according to the present invention, a low-melting solder is coated with a film of a higher-melting substance; and Fig. 3 shows a vessel in partial section prior to the exhausting of the vessel provided with a sealing solder coated with a film of a higher melting point substance.

In the drawing, reference numeral 1 denotes the extremity of a tube, for example a metal exhaust tube of an electric discharge tube. This extremity is provided with an aperture 2 through which the tube is exhausted and which is closed by an amount of solder 3, for example tin.

In the construction shown in Figure 1, the solder has been pushed aside, resulting in projecting parts 4 which must be removed. In the form of construction shown in Fig. 2, the sealing substance is coated with a film 5 of a material which has a higher melting point than the solder and which does not soften at the temperature at which the tube is closed. In this case the solder, as is shown in the drawing, remains inside the aperture and an additional operation is not required. Besides, a firmer contact between the body pressed into the aperture and the solder is possible. As will be clearly seen from Fig. 3, the solder 10 is applied to the walls around the aperture and when the tube is exhausted, the tube is sealed by the method as disclosed in my copending application.

In the case shown and in the indicated position of the tube in which the aperture of the exhaust tube is directed downwards, the obturation is preferably effected by pressing the solder during the heating thereof with the aid of a body from outside. However, it is also possible to apply the method according to the invention to a known construction of a tube.

What I claim is:

1. A method of exhausing and sealing a closed vessel comprising a metal wall portion with an exhaust port therein and with a body of a fusible low melting point sealing substance in and partially obstructing said port and having an exposed surface, comprising the steps of applying a film of material on the said exposed surface of said fusible substance having a melting point greater than that of the said fusible substance, exhausting the said vessel through said port, and heating said fusible substance to close said port and seal said vessel.

2. A method of exhausting and sealing a vessel comprising a wall portion with an exhaust portion therein and with a body of a fusible low melting point sealing substance in and partially obstructing said port and having an exposed surface, comprising the steps of applying a film of nickel to the said exposed surface of said fusible substance, exhausting said vessel through said port, and heating said fusible substance to close said port and seal said vessel.

3. A vessel having a chamber adapted to be evacuated, a wall portion having an exhaust port therein, a body of a fusible low melting point metal in and only partially obstructing said port, and a layer of protective metal on said fusible metal and remote from said port, said protective metal having a melting point greater than that of the said fusible metal.

4. A vessel having a chamber adapted to be evacuated, a wall portion having an exhaust port therein, a body of a fusible low melting point metal in and only partially obstructing said port, and a layer of nickel over the said fusible metal and remote from said port.

5. A vessel having a chamber adapted to be evacuated, a wall portion having an exhaust port therein, a body of a fusible low melting point metal in and only partially obstructing said port, and a layer of copper over said fusible metal and remote from said port.

6. A closed vessel having an evacuated chamber, a wall portion having an exhaust port, a seal of fusible metal closing said port, and a film of metal having a higher melting point than that of said fusible metal and having a thickness between approximately 10 and 50 microns covering said fusible metal.

WILHELMUS ANTONIUS ROOVERS.

REFERENCES CITED

The following references are of record in the file of this patent:

UNITED STATES PATENTS

| Number | Name | Date |
| --- | --- | --- |
| 988,324 | Fate | Apr. 4, 1911 |
| 1,914,634 | Eden et al. | June 20, 1933 |
| 2,174,682 | Beggs | Oct. 3, 1939 |
| 2,248,644 | Reger et al. | July 8, 1941 |
| 2,380,811 | Walker | July 31, 1945 |